(12) United States Patent
Pieterman

(10) Patent No.: US 7,204,589 B2
(45) Date of Patent: Apr. 17, 2007

(54) ADJUSTABLE PRESCRIPTION LENS INSERT FOR SAFETY EYEWEAR

(75) Inventor: Jan-Joost Pieterman, Uithoorn (NL)

(73) Assignee: North Safety Products Europe B.V., Middleburg (NL)

( * ) Notice: Subject to any disclaimer, the term of this patent is extended or adjusted under 35 U.S.C. 154(b) by 0 days.

(21) Appl. No.: 11/078,836

(22) Filed: Mar. 11, 2005

(65) Prior Publication Data

US 2006/0203187 A1    Sep. 14, 2006

(51) Int. Cl.
G02C 9/00    (2006.01)
(52) U.S. Cl. .............. 351/47; 351/48; 351/57
(58) Field of Classification Search .......... 351/41, 351/44, 47, 48, 57, 58
See application file for complete search history.

(56) References Cited

U.S. PATENT DOCUMENTS

| 5,929,963 | A | * | 7/1999 | McNeal ............ 351/47 |
| 6,019,468 | A | | 2/2000 | Altemare, Jr. |
| 6,497,756 | B1 | | 12/2002 | Curado et al. |
| 6,502,937 | B2 | * | 1/2003 | Yang ............... 351/57 |
| D484,436 | S | | 12/2003 | Landry |
| D484,437 | S | | 12/2003 | Doyon |
| 6,708,376 | B1 | | 3/2004 | Landry |
| 6,817,362 | B2 | | 11/2004 | Galinas et al. |

* cited by examiner

Primary Examiner—Huy K. Mai
(74) Attorney, Agent, or Firm—Abelman, Frayne & Schwab

(57) ABSTRACT

A protective eyewear article including:
  a. a transparent shield formed as a curved panel including a central nose area, the shield adapted for placement on a wearer's face.
  b. a prescription lens insert adapted to be attached to the shield, to releasably hold prescription lenses and to allow adjustment of position and orientation of the lenses in relation to the shield, the insert comprising:
    (i) a set of eye wires, each defining a closed loop having top and bottom parts, each loop adapted to circumscribe and hold the edges of a lens,
    (ii) a central bridge portion having opposite sides, and
    (iii) a set of upper and lower arms extending outward from each of the sides of the central bridge portion, the upper and lower arms of each set having proximal ends fixed to one of the sides of the central bridge portion and distal ends fixed to the top and bottom parts of one of the eye wires, respectively, and
  c. means for connecting the central bridge portion of the insert to the corresponding central nose area of the shield,
  d. the arms being bendable for adjusting the position and orientation of the lenses relative to the shield.

12 Claims, 4 Drawing Sheets

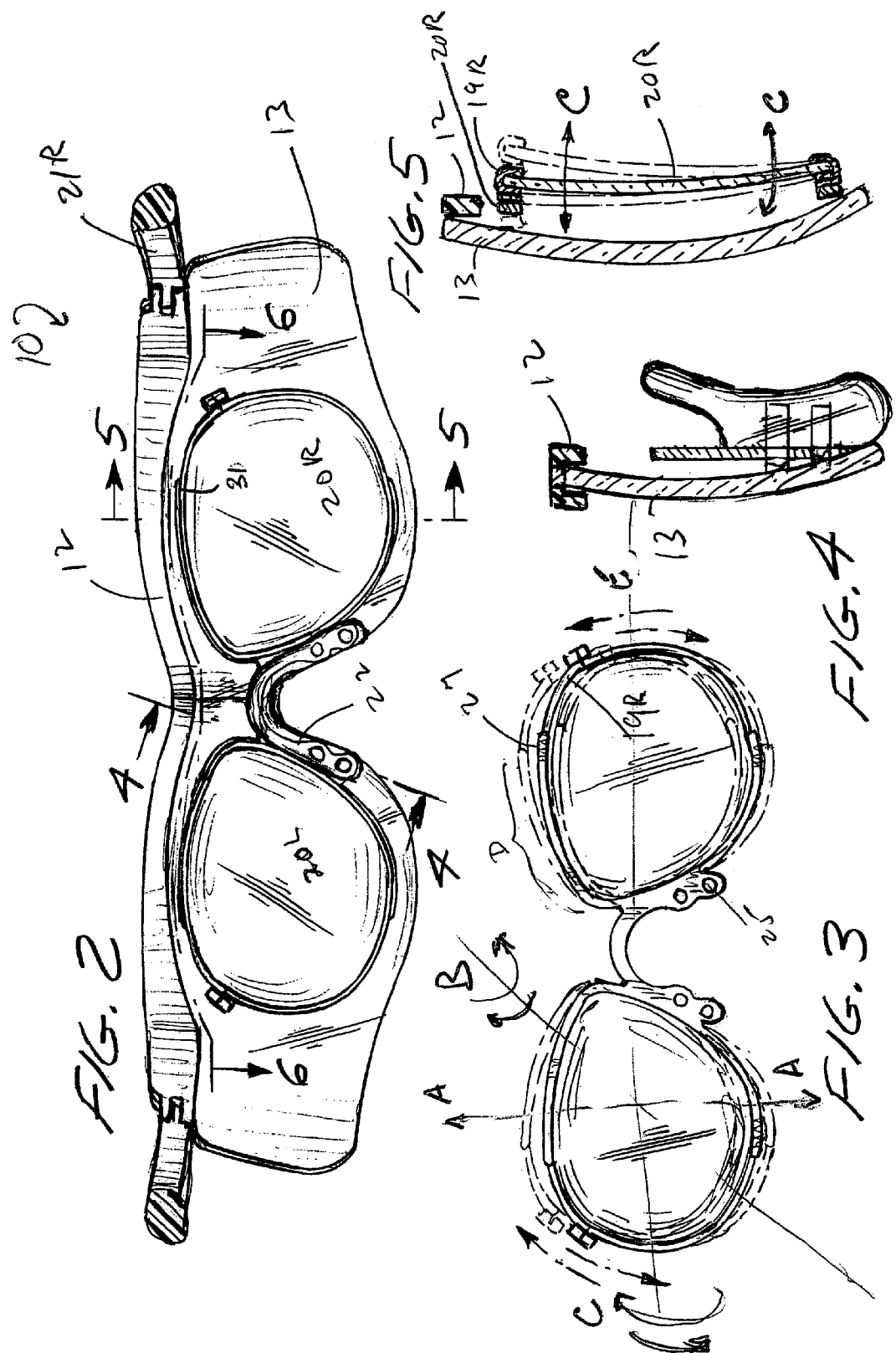

Figure 1:
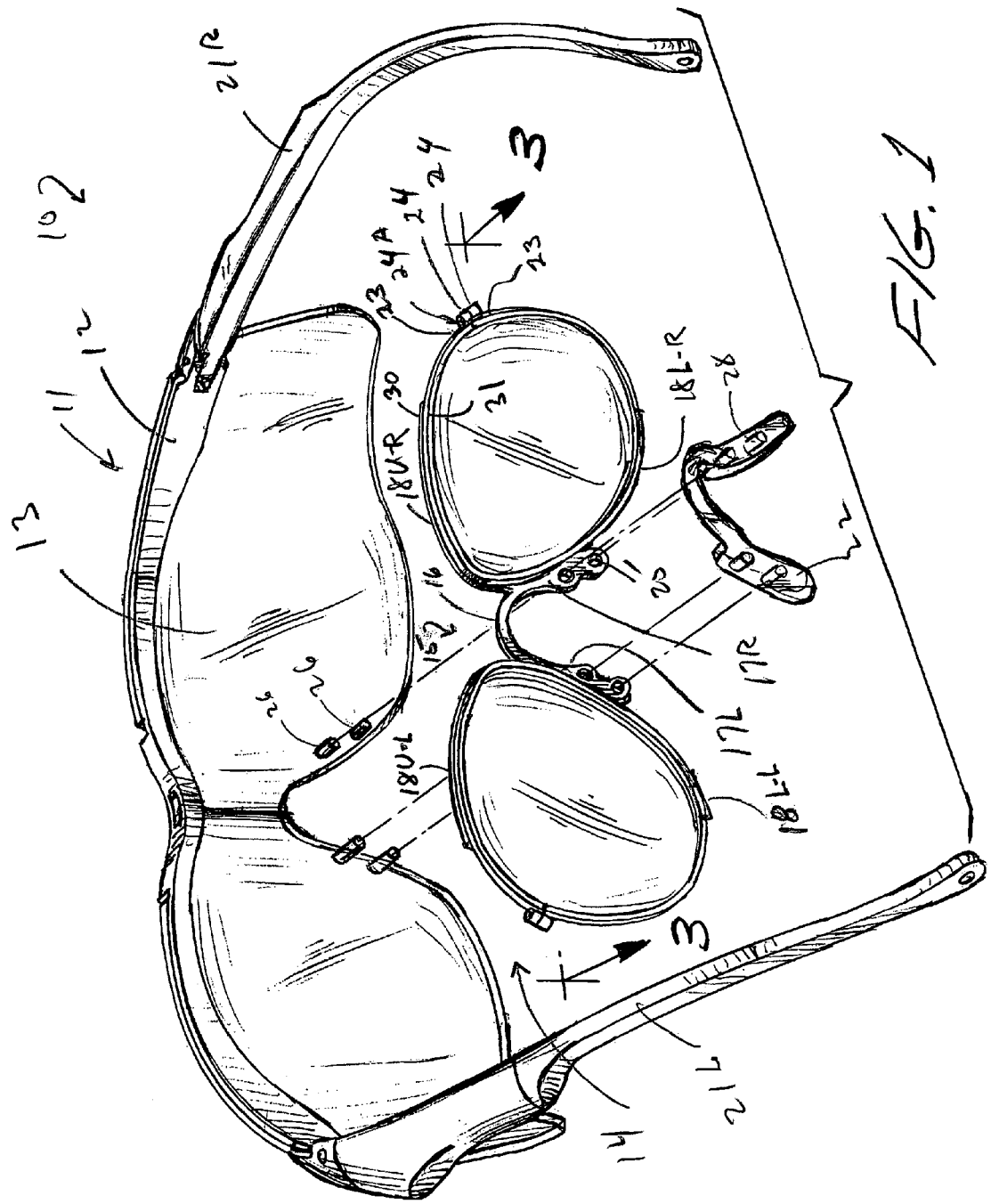

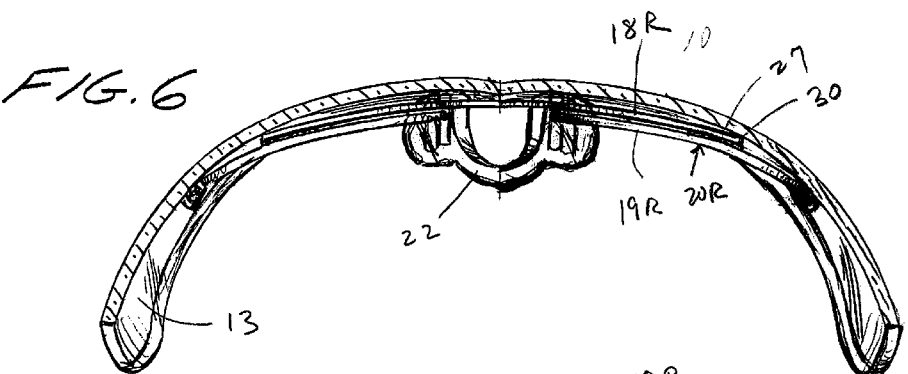
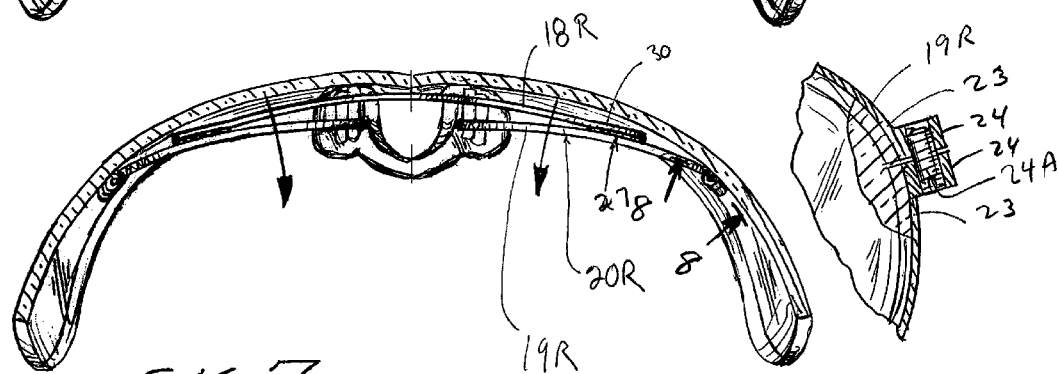

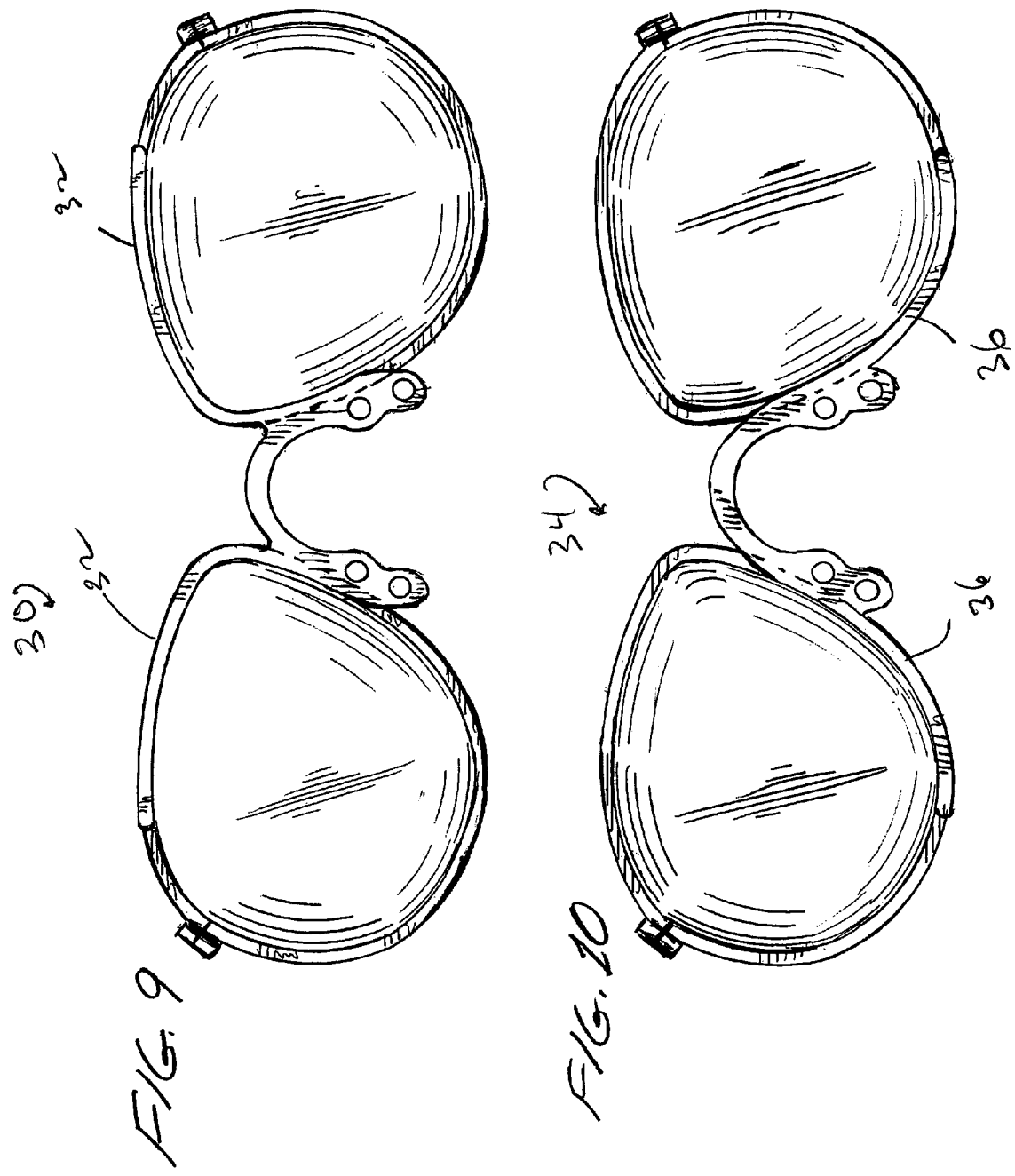

ADJUSTABLE PRESCRIPTION LENS INSERT FOR SAFETY EYEWEAR

A. FIELD OF THE INVENTION

This invention is in the field of safety eyewear, such as safety eye shields and masks, and particularly eye shields on which prescription optical lenses can be mounted.

B. BACKGROUND OF THE INVENTION

Protective eyewear is highly useful in many industrial, sports and leisure activities, and in numerous of these activities use of protective eyewear is mandatory under industrial and/or governmental regulations. A partial listing of situations where use of protective eyewear is now common includes, but is not limited to, environments where there is dust, pollution and sparks, flying fragments of various sizes, high wind, and in chemical laboratories, welding, machining and assembly areas, and essentially in any environment where any foreign substance or particle could move into contact with the eye. Exemplary areas of protective eyewear use in sports and leisure fields, include skiing, bicycling, flying, vehicle racing of all types, water sports, skydiving and hobbies. Still further areas of use include use in respirator masks and in gas masks.

The focus of the present invention is on protective eyewear which includes prescription lenses. As used herein, protective eyewear or safety eyewear includes eye shields of single or dual lens styles, face masks, goggles, safety spectacles, safety eyeglasses and safety eyewear generally. For convenience herein, the terms "protective eyewear" or "safety eyewear" will be used to cover all the protective eyewear articles described above.

Safety eyewear products in the form of eye shields, goggles, facemasks and helmets with eye shields are well known and are effective for their protective purposes. However, use of these products by persons who wear prescription eyeglasses, often leads to problems. Most safety eyewear does not fit well or does not fit at all over basic eyeglasses. Where it might fit well, it would be excessively large. To circumvent this problem, some safety eyewear is designed to include lens mounting components to hold individual prescription lenses within the safety eyewear frame. While the concept of mounting prescription lenses in an eye shield is basically simple, there have been difficulties and inadequacies with the results.

A principal problem has been lack of adjustability, namely the inability to achieve the same full adjustability of lenses in a safety shield that an optician could achieve with a basic eyeglass frame.

A basic eyeglass frame is adjustable about a variety of axes and planes, such as:
  a. to tilt each lens about a horizontal axis,
  b. to tilt each lens about a vertical axis,
  c. to move each lens up, down, forward or backward,
  d. to angulate each lens relative to the frame or relative to the other lens, and
  e. to twist a lens about selected axes.

These adjustments are possible with many eyeglass frames, because of the traditional and basic eyeglass construction, a fundamental example being a frame comprising a pair of eye wires joined by a central bridge, and a pair of earpieces, or temples, extending from the frame. The shapes, sizes and styles of frames and central bridges vary greatly.

For reasons of comfort, safety and aesthetics, it is often desirable to form a safety shield as a concave curve for positioning adjacent the front of the face. Normal prescription eyeglass frames have the set of lenses side-by-side in a generally flat or only mildly curved arc. In eye shields of contemporary design and style, the shield curvature is typically greater than the curvature that occurs in an eyeglass frame, and consequently, lenses mounted on the interior surface at the shield curvature can create optical distortion for the wearer.

In summary, the current safety eyewear has problems and disadvantages pertaining to the inability to fully adjust prescription lenses after they are inserted in the mounting frame, and the cost and difficulty to replace prescription lenses in safety eyewear.

C. OBJECTS AND SUMMARY OF THE NEW INVENTION

It is an object of this invention, not only to mount prescription lens to the shield without being constrained to the shield curvature, but to have an adjustable mount where each lens can be individually positioned and angularly oriented independently of the shield curvature. Furthermore, the new mount should allow for easy replacement of scratched or otherwise damaged prescription lenses. It is a further object to provide an adjustable prescription lens insert for safety eye shields where the insert has upper and lower arms connected to each eye wire holding a lens.

An additional object is to provide, as an alternative embodiment, support for each eye wire and enclosed lens by only a single arm from the bridge part, namely by an arm to the top or bottom of each eye wire, instead of a pair of arms connected to the top and bottom of each eye wire loop.

The present invention comprises a prescription lens insert, and a combination of prescription lens insert and safety shield, and a method of making a safety shield which includes prescription lenses.

The steps in the new method or procedure of manufacture include:
  a. cutting lenses pursuant to their prescriptions;
  b. mounting each lens within an eye wire which is fixed to an insert frame;
  c. mounting the insert frame with attached lenses on a safety shield frame or directly on a safety shield which has no frame;
  d. bending and/or twisting said insert frame until each lens is properly positioned relative to the pupil of wearer's eye when the lens shield is positioned on the wearer's face; and
  e. subsequently, if necessary, replacing individual lenses in the insert frame and adjusting same.

The final step can be performed with or without separating the insert frame from the lens shield or lens shield frame.

In one preferred embodiment the new protective eye wear comprises:
  a. a transparent shield formed as a curved panel including a central nose area, said shield adapted for placement on a wearer's face.
  b. a prescription lens insert adapted to be attached to said shield, to releasably hold prescription lenses and to allow adjustment of position and orientation of said lenses in relation to said shield, said insert comprising:
   (i) a set of eye wires, each defining a closed loop having top and bottom parts, each loop adapted to circumscribe and hold the edges of a lens,
   (ii) a central bridge portion having opposite sides, and
   (iii) a set of upper and lower arms extending outward from each of said sides of said central bridge portion, said upper and lower arms of each set having proximal ends fixed to one of said sides of said central bridge portion and distal ends fixed to said top and bottom parts of one of said eye wires, respectively, and c. means for connecting said central bridge portion of the insert to the corresponding central nose area of said shield, d. said arms being bendable for adjusting the position and orientation of said lenses relative to said shield.

The above is intended merely as a summary of various inventive aspects presented in the present application and is in no way intended to be an exhaustive or all-inclusive recitation of such aspects. Additional aspects, forms, features and embodiments of the present invention will be further described below with regard to the preferred embodiments and shown in the accompanying drawings.

D. BRIEF DESCRIPTION OF THE DRAWINGS

FIG. 1 is a top rear perspective exploded view of the new safety eyewear, including a frame and shield, and the prescription lens insert with attached prescription lenses, FIG. 2 is a rear elevation view of the safety eyewear of FIG. 1 in an assembled state, FIG. 3 is a front elevation view of the insert frame with attached eye wires and lenses before attachment to a safety shield frame, FIG. 4 is a sectional view taken along line 4—4 in FIG. 2, FIG. 5 is a sectional view taken along line 5—5 in FIG. 2, FIG. 6 is a top plan view of the assembled safety eyewear with the insert frame shown in an unbent state, FIG. 7 is a top plan view similar to FIG. 6 showing the insert frame with its arms in a bent state, FIG. 8 is a fragmentary sectional view taken along line 8—8 in FIG. 7, FIG. 9 is a front elevation view of a second embodiment of the insert of FIG. 1, with arms extending to the tops of the eye wires, and FIG. 10 is a front elevation view of a third embodiment of the insert of FIG. 1, with arms extending to the bottom of the eye wires.

E. DETAILED DESCRIPTION OF THE PREFERRED EMBODIMENTS

A first embodiment of the new safety eyewear 10 as seen in FIGS. 1–8, comprises:

a. a safety shield sub-assembly 11 comprising frame 12 and transparent optical shield 13 secured to frame 12;

b. a prescription lens insert subassembly 14 comprising: (1) bridge 15 having central part 16 with opposite sides 17L, 17R, (2) a set of upper and lower arms extending from each of said sides 17L, 17R respectively, these arms being designated 18U-L for upper left, 18 L-L for lower left, 18U-R for upper right and 18L-R for lower right, and (3) eyewires 19L, 19R, each surrounding and holding a prescription lens 20R, 20L. The left and right sides of the shield, the insert and the lenses are substantially the same, but one being the mirror image of the other. Thus, the description of one side will suffice for both;

c. temples or earpieces 21L, 21R extending from opposite ends of frame 12; and d. nose piece 22 secured to bridge 15.

The novelty of the present structure is found in the mounting and adjustability of the prescription lenses within a safety shield. As seen in FIGS. 1–8, each prescription lens is releasably secured within an eye wire 19L, 19R. For the reasons explained above, only the right lens and right eye wire will be described, since the left and right lenses and mounts are essentially the same, and each lens may vary depending on its own specific corrective prescription.

As seen in FIGS. 1–3 and 8, eye wire 19R is a wire or band of material, formed as a closed loop so that opposite ends 24 of this wire are closely adjacent. Each end 23 has a coupling element 24, the coupling elements being releasably pulled together or joined by a screw 24A or other joining element. Release of this coupling allows the loop to be enlarged, so that lens 20R can be inserted and secured within the loop or removed and replaced.

FIGS. 1 and 4 show the mode of attachment of insert frame 14 to shield 11. After both prescription lenses 20R, 20L are installed within eye wires 19R, 19L, respectively, of insert sub-assembly 14, insert bridge 15 is secured via holes 25 to pins 26 which extend generally rearwardly from shield 13 in the nose region thereof. Pins 26 are either attached to shield 13 or integrally molded therewith. The diameters and spacing of holes 25 can be selected so they fit directly onto pins 26, or the spacing can be slightly different so that bridge must be sprung to be in alignment, which will result in a tight self-retaining fit.

Following attachment of bridge 15 to shield 13, nose piece 22 is secured onto the same pins 26. This nose piece has holes 28 which frictionally engage pins 26; however, this coupling of nose piece 22 to pins 26 can be designed to be strong enough to secure bridge 16 in place. Alternatively, friction pins 26 can be replaced with screws or other fastening elements.

The prescription lenses can be installed or replaced before or after bridge 15 is installed.

As seen in FIG. 7, a further aspect of the new structure is the welded junction 27 between the terminal end 30 of upper arm 18U-R to upper area 31 of eye wire 19R. Such junction can also be formed by soldering, brazing or glueing, depending on the materials of bridge 15 and arm 18U-R. The same weld junction is employed between the terminal end of lower arm 18L-R and the bottom of eye wire 19R, and between corresponding parts on the left side of insert 14.

Each of these four arms is deformable by bending or twisting along the length D, as seen in FIG. 3, extending between the weld junction 27 at the terminal end of each arm back to bridge 15. Similar bending occurs in lower arms 18L on the right and left side.

a. Various combinations of these arms are bendable and or twistable to provide adjustment capability of the prescription lenses in the following modes. FIG. 5, for example, shows how the top of eye wire 19R and enclosed lens can be tipped or angulated about a horizontal axis. FIG. 7 illustrates how eye wire 19R and enclosed lens can be moved rearwardly from its position in FIG. 6. FIG. 3 shows how eye wire 19R and enclosed lens can be moved upwardly or downwardly. It is apparent that eye wire and its enclosed lens can also be twisted and tipped in other ways to ultimately achieve the optimum position and orientation.

With lens adjustability options as described above, a safety shield having a standard predetermined curvature, seen in FIG. 1, can receive prescription lens inserts with lenses of many different prescriptions and be adjusted for proper fitting to faces of many different front contours.

With the prescription lens insert structure disclosed herein, the many adjustments possible include the following and combination of same:
   a. up and down, as indicated by arrows A in FIG. 3,
   b. varying the angle, as indicated by arrows B in FIG. 3,
   c. tilting or twisting, as indicated by arrows C in FIG. 5 and by arrow C about a horizontal axis D in FIG. 3 (the top and bottom may be tilted independently or simultaneously), and
   d. angling, as indicated by arrows E about a horizontal axis generally parallel to an axis through the lens.

In connection with the manufacture of the new prescription lens insert ("Rx Lens Insert) a specification sheet showing additional details is attached as Appendix A. In the preferred embodiment illustrated herein, the eye wire is hypo-allergenic Movel metal and the Rx insert frame is stainless steel.

Further embodiments of the present invention are shown in FIG. 9 where the insert 30 has arms 32 only at the top, and in FIG. 10 where the insert 34 has arms 36 only at the bottom.

While the invention has been described in conjunction with several embodiments, it is to be understood that many alternatives, modifications, and variations will be apparent to those skilled in the art in light of the foregoing description. Accordingly, this invention is intended to embrace all such alternatives, modifications, and variations which fall within the spirit and scope of the appended claims.

The invention claimed is:

1. A protective eyewear article comprising:
   a. a transparent shield formed as a curved panel including a central nose area, said shield adapted for placement on a wearer's face;
   b. a prescription lens insert adapted to be attached to said shield, to releasably hold prescription lenses and to allow adjustment of position and orientation of said lenses in relation to said shield, said insert comprising:
      (i) a set of eye wires, each defining a closed loop having top and bottom parts, each loop adapted to circumscribe and hold the edges of a lens,
      (ii) a central bridge portion having opposite sides, and
      (iii) a set of upper and lower arms extending outward from each of said sides of said central bridge portion, said upper and lower arms of each set having proximal ends fixed to one of said sides of said central bridge portion and distal ends fixed to said top and bottom parts of one of said eye wires respectively, and
   c. means for connecting said central bridge portion of the insert to the corresponding central nose area of said shield,
   d. said arms being bendable for adjusting the position and orientation of said lenses relative to said shield.

2. A protective eyewear article according to claim 1, wherein each of said eye wires is adjustable in circumferential size between open to receive a lens and closed to securely hold said lens.

3. A protective eyewear article according to claim 1, wherein each of said upper and lower arms has a middle section between said proximal and distal ends, and wherein only said proximal ends and distal ends contact said central portion and said eye wires respectively.

4. A protective eyewear article according to claim 1, wherein said central bridge portion and said upper and lower arms, extending therefrom define, in top plan view an arc of predetermined curvature, said curvature being variable by bending said arms.

5. A protective eyewear article according to claim 1, wherein said shield has opposite side edges, and wherein said means for releasably securing said shield on a wearer's face comprises a set of earpieces coupled to said opposite side edges respectively.

6. A protective eyewear article according to claim 1, wherein said central bridge portion comprise an inverted U-shape.

7. A protective eyewear article comprising:
   a. a transparent shield formed as a curved panel including a central nose area, said shield adapted for placement on a wearer's face;
   b. a prescription lens insert adapted to be attached to said shield, to releasably hold prescription lenses, and to allow adjustment of position and orientation of said lenses, said insert comprising:
      (i) an insert frame including a central bridge portion having opposite sides,
      (ii) a set of eye wires, each defining a closed loop having top and bottom portions, each loop adapted to circumscribe and hold the edges of a lens, each loop fixed to one of said opposite sides of said insert frame, and
   c. means for connecting said central bridge portion of said insert to the corresponding central nose area of said shield,
   d. said insert frame being bendable for adjusting the position and orientation of said lenses relative to said shield.

8. A prescription lens insert adapted to releasably hold prescription lenses and to be releasably attached to a protective eye shield having a curved shield portion and a central nose area of said shield,
   said insert comprising:
   a. an insert frame including a central bridge portion having opposing sides,
   b. a set of eye wires fixed to said opposing sides, each eye wire defining a closed loop having top and bottom portions, each loop adapted to circumscribe and hold the edges of a lens,
   said central bridge portion holding said eye wires in spaced apart relationship, and
   c. means for connecting said central bridge portion to the corresponding central nose area of said shield,
   d. said frame being bendable for adjusting the position and orientation of said lenses relative to said shield.

9. A protective eyewear article comprising:
   a. a shield formed as a transparent panel including a central nose area;
   b. means for releasably securing said shield on a wearer's face;
   c. a prescription lens insert adapted to be attached to said shield, to releasably hold prescription lenses and to allow adjustment of position and orientation of said lenses in relation to said shield, said insert comprising:
      (i) a set of eye wires, each defining a closed loop having top and bottom parts, each loop adapted to circumscribe and hold the edges of a lens,
      (ii) a central bridge portion having opposite sides, and
      (iii) a set of upper and lower arms extending outward from each of said sides of said central bridge portion, said upper and lower arms of each set having proximal ends fixed to one of said sides of said central bridge portion and distal ends fixed to said top and bottom parts of one of said eye wires respectively, and d. means for connecting said central bridge portion of the insert to the corresponding central nose area of said shield, e. said arms being bendable for adjusting the position and orientation of said lenses relative to said shield.

10. A protective eyewear article according to claim 9, wherein said shield has opposite side edges, and wherein said means for releasably securing said shield on a wearer's face comprises a set of earpieces coupled to said opposite side edges respectively.

11. A protective eyewear article according to claim 9, wherein said central bridge portion comprise an inverted U-shape.

12. A method of adjusting the position of the lenses of a protective eyewear article of claim 9, comprising the steps of bending at least one of said sets of upper and lower arms relative to said central bridge portions:
   (a) upward or downward, and/or
   (b) forward or backward, and/or
   (c) angularly by twisting.

* * * * *